United States Patent [19]

Okuma

[11] Patent Number: 4,610,226

[45] Date of Patent: Sep. 9, 1986

[54] COMBUSTION DEVICE OF AN INTERNAL COMBUSTION ENGINE

[76] Inventor: Takeshi Ōkuma, No. 2962-23, Zindaiji, Chofushi, Tokyo, Japan

[21] Appl. No.: 612,018

[22] Filed: May 18, 1984

[30] Foreign Application Priority Data

May 18, 1983 [JP] Japan ................................ 58-87100

[51] Int. Cl.⁴ ........................ F02P 23/00; F02B 19/08; F02B 23/04
[52] U.S. Cl. ................................ 123/143 A; 123/290; 123/661
[58] Field of Search ............... 123/289, 290, 661, 657, 123/662, 663, 664, 671, 262, 263, 193 P, 193 CP, 143 A

[56] References Cited

U.S. PATENT DOCUMENTS

| | | | |
|---|---|---|---|
| 973,651 | 10/1910 | Haberkorn | 123/143 A |
| 1,163,604 | 12/1915 | Raser | 123/143 A |
| 1,189,906 | 7/1916 | Bangs | 123/143 A |
| 1,515,562 | 11/1924 | Enssle | 123/143 A |
| 2,222,440 | 11/1940 | Nawman | 123/143 A |
| 2,688,320 | 9/1954 | Czarnoki | 123/661 |
| 2,735,416 | 2/1956 | Ferguson et al. | 123/661 |

FOREIGN PATENT DOCUMENTS

| | | | |
|---|---|---|---|
| 572951 | 3/1933 | Fed. Rep. of Germany | 123/290 |
| 517353 | 5/1921 | France | 123/143 A |
| 42514 | 4/1979 | Japan | 123/661 |
| 1156821 | 7/1969 | United Kingdom | 123/143 A |

*Primary Examiner*—Tony M. Argenbright
*Attorney, Agent, or Firm*—Wenderoth, Lind & Ponack

[57] ABSTRACT

A combustion device for an internal combustion engine which includes a cylinder, a head closing one end of the cylinder, and a piston reciprocable in the cylinder. The head and piston have stepped portions adapted to interfit as the piston approaches the head so as to define a compression chamber and a combustion chamber of greater volume than the compression chamber, for receiving a fuel charge, and a restricted passage between the combustion chamber and the compression chamber. The head and piston are shaped and the device is otherwise provided with structure so that as the piston approaches dead center, a portion of the charge compressed in the compression chamber combusts spreading combustion gases and flame through the restricted passage so as to immediately thereafter cause swirling of, and ignite the portion of the charge in, the gases in the combustion chamber.

1 Claim, 5 Drawing Figures

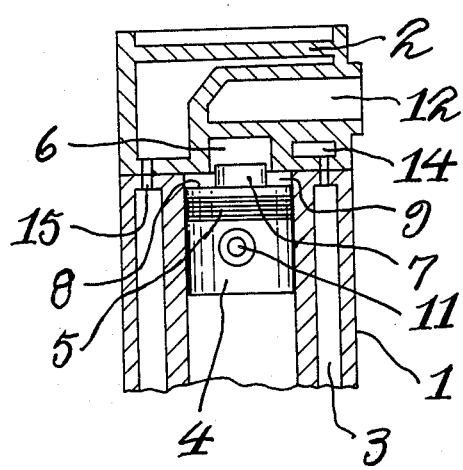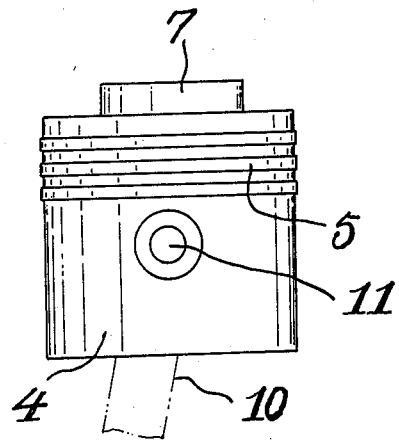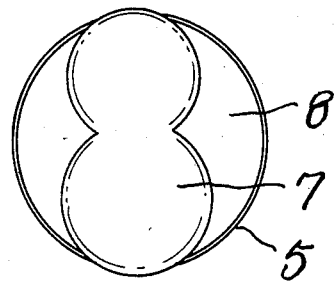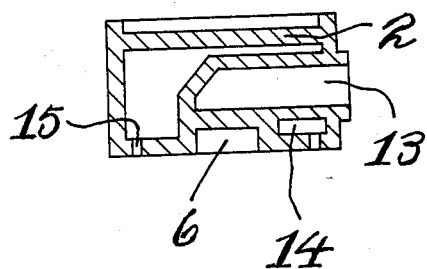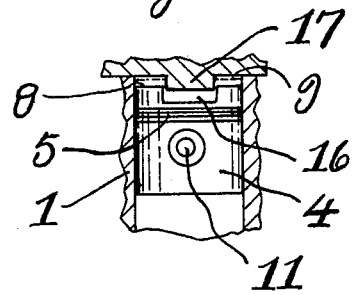

COMBUSTION DEVICE OF AN INTERNAL COMBUSTION ENGINE

BACKGROUND OF THE INVENTION

This invention relates to a combustion device for an internal combustion engine and more particularly to such a device that produces good swirl to improve combustion in the combustion chamber of an internal combustion engine such as a gasoline engine or a diesel engine.

BRIEF SUMMARY OF THE INVENTION

In accordance with the invention, the good swirl is produced by producing prior to the combustion in the combustion chamber before the upper dead point (dead center) in the compression stroke of the piston "as the high rotation of the engine", a transmission fire combustion in a compression chamber which opposes a sub-compression part of the piston, which compression chamber communicates with the combustion chamber. The device also prevents a stall which continually appears for a short time during quick acceleration of the engine rotation.

This invention provides such operation with a combustion device of an internal combustion engine, in which a projection sub-compression part is provided on the piston head or the cylinder head and the combustion chamber is provided at the place which opposes the piston head or the cylinder head, and the sub-compression part partially or entirely surrounds the said compression part.

BRIEF DESCRIPTION OF DRAWINGS

FIG. 1 is a sectional view of a combustion device of an internal combustion engine in accordance with the invention, FIG. 2 is the front view of the piston, FIG. 3 is the plane view of the piston shown in FIG. 2, FIG. 4 is a partial view showing the gas-outlet port in the cylinder head, and FIG. 5 is a sectional view of another embodiment of the invention in which the combustion chamber has a hollow portion at the piston head.

DETAILED DESCRIPTION OF THE PREFERRED EMBODIMENTS

This invention relates to a combustion device of an internal combustion engine.

This invention consists of a combustion device of an internal combustion engine in which the combustion chamber in the cylinder head of a gasoline or diesel combustion engine has a projecting compression part on the piston head opposing the combustion chamber, or said piston head has a recess opposing a projection in the cylinder head, a sub-compression part partially or completely surrounding the subject compression part or the said combustion chamber in the situation where a recess is provided in the piston head, and a compression chamber is formed opposing the sub-compression part, wherein space is provided for gas passing between the combustion chamber and the compression chamber. The elements are arranged to produce good swirl by causing rushing into the combustion chamber of the mixture or the air compressed in the said compression chamber, with a remarkable high compression ratio in between these chambers.

To explain the references in the drawings:

Reference numeral 1 denotes a cylinder, reference numeral 2 denotes a cylinder head having an air-in port, reference numeral 3 denotes a water chamber, reference numeral 4 denotes a piston, reference numeral 5 denotes a piston ring, with which is comprised an ordinary unit, reference numeral 6 denotes a combustion chamber in which is received the cylinder head, reference numeral 7 denotes a compression part of the piston having a cross section generally in the shape of a figure 8 which projects into the combustion chamber, reference numeral 8 denotes a sub-compression part which surrounds the subject compression part in the head of the piston 4, reference numeral 9 denotes the compression chamber which opposes the sub-compression part 8 and has a volume less than that of combustion chamber 6 at the time of combustion, reference numeral 10 denotes a connecting rod, reference numeral 11 denotes a piston pin, reference numeral 12 denotes the air-in port, reference numeral 13 denotes a gas-out port, reference numeral 14 denotes a water chamber, and reference numeral 15 denotes a pass hole, which permits the cooling water of the engine to circle through a water chamber.

In the FIG. 5 which shows another example, reference numeral 16 denotes a combustion chamber having a recess at the piston head, and reference numeral 17 denotes a part of the cylinder head which projects at the place opposing combustion chamber 16, other structure of the device being the same as the prior example.

The operation of this invention will now be explained with reference to the example shown in FIGS. 1-4.

During compression of the fuel/air mixture in the combustion chamber by a return trip of the piston 4, a remarkable high compression ratio is produced by the design. The high fuel/air mixture in the compression chamber is rushed into the combustion chamber to produce the desired swirl in the compression chamber as the piston reaches dead center and as the flame in the compression chamber is transmitted to and causes firing in the combustion chamber. Of course, the said compression ratio is able to be arranged by selection of the height of the compression part 7.

In the example shown in FIG. 5, its action is the same as that illustrated in FIGS. 1-4 except that it is performed in the combustion chamber 16.

In this invention, the said remarkable compression ratio produces the swirl so as to improve the combustion of the air/fuel mixture or other fuel in the combustion chamber, and results from the rush of gases from the compression chamber and especially where the good swirl has been demonstrated in the result of an experiment. Therefore, the firing of the fuel in a combustion engine in accordance with the invention is good, and the fuel expense is reduced. Also, to exclude a public nuisance the operation is just so in the combustion device of this invention, that knocking does not occur, a combustion engine of high compression ratio and high output power can be obtained and, moreover, in the diesel engine, has the characteristics that exhaust of black smoke is greatly decreased.

I claim:

1. A combustion device of an internal combustion engine including
    a cylinder;
    a cylinder head closing one end of said cylinder; and
    a piston reciprocable in said cylinder;

said head and piston having stepped portions adapted to interfit as said piston approaches said head so as to define a compression chamber, and a combustion chamber of greater volume than that of said compression chamber, for receiving a fuel charge, and a restricted passage from said compression chamber to said combustion chamber;

said stepped portions comprising means for compressing and combusting a portion of the charge compressed in said compression chamber, as said piston approaches dead center, so as to spread combustion gases and flame through said restricted passage so as to immediately thereafter cause swirling of, and ignition of the portion of the charge in, the gases in said combustion chamber;

said head having a cylindrical wall having a central axis, defining therein said combustion chamber, said piston having a forward end having a cross section perpendicular said axis generally in the shape of a figure 8, having first and second circular portions meeting at a center portion, said restricted passage being defined between said center portion and said cylindrical wall.

* * * * *